United States Patent [19]

Williams et al.

[11] Patent Number: 5,308,114

[45] Date of Patent: May 3, 1994

[54] WIRE CUTTING DEVICE FOR LAND VEHICLES

[75] Inventors: Robert C. Williams, Killeen, Tex.; Stephen W. Bachinski, Ft. Knox, Ky.

[73] Assignee: The United States of America as represented by the Secretary of the Army, Washington, D.C.

[21] Appl. No.: 987,729

[22] Filed: Dec. 8, 1992

Related U.S. Application Data

[63] Continuation of Ser. No. 834,959, Feb. 14, 1992, abandoned.

[51] Int. Cl.$^5$ .................. B60R 11/00; B60R 27/00
[52] U.S. Cl. .................. 280/762; 30/140; 83/16; 89/36.08; 219/50; 219/202
[58] Field of Search .............. 280/762, 770; 180/182, 180/184, 186, 190; 89/36.08; 30/140; 219/68, 155, 202, 50; 83/15, 16, 170, 171, 651.1, 950

[56] References Cited

U.S. PATENT DOCUMENTS

| | | | |
|---|---|---|---|
| 1,289,196 | 12/1918 | Kroskowski | 89/36.08 |
| 1,317,323 | 9/1919 | Schmidt | 89/36.08 |
| 3,724,579 | 4/1973 | Albertson | 180/182 |
| 3,743,316 | 7/1973 | Stotesberg | 180/182 |
| 3,770,793 | 11/1973 | Anderson | 180/182 |
| 3,797,344 | 3/1974 | Hattmann, III | 83/950 |
| 3,841,656 | 10/1974 | Kramb et al. | 180/182 |
| 4,528,435 | 7/1985 | Billon-Pierron et al. | 83/950 |
| 4,743,730 | 5/1988 | Martin et al. | 219/155 |
| 5,025,136 | 6/1991 | Doege et al. | 219/202 |

*Primary Examiner*—Richard M. Camby
*Attorney, Agent, or Firm*—Anthony T. Lane; Werten F. W. Bellamy

[57] ABSTRACT

A wire cutter for electrically cutting a path through wires to allow a land vehicle to pass therethrough is provided. The wire cutter does not use the forward motion of the vehicle to provide the actual cutting and in general can cut any thickness of wire located in front of the vehicle. The wire cutter device includes first and second conductive rods mounted in spaced relationship and connected to voltages of different values, e.g., to the positive and negative terminals of a power supply. A wire catcher device, comprising a pair of arms which are arranged in a U-shaped configuration and on which the rods are mounted, is provided for capturing wires located in the path of the vehicle and for guiding wires so captured to the rods so as to complete an electrical circuit through the rods and thus provide melting of wires so captured.

15 Claims, 2 Drawing Sheets

WIRE CUTTING DEVICE FOR LAND VEHICLES

This is a continuation of application Ser. No. 07/834,959, filed Feb. 14, 1992, now abandoned.

FIELD OF THE INVENTION

This invention relates generally to wire cutting devices and, more specifically, to a wire cutting device for land vehicles such as tanks, other armored vehicles, or mine plows or rollers for such vehicles.

BACKGROUND OF THE INVENTION

It is a common practice to use coils of barbed wire, referred to as concertina wire and having a height of several feet or more, to protect against or hinder the travel of land vehicles and troops on a battlefield. For example, such wire coils are deployed to prevent wheeled vehicles such as tanks, or personnel, or both, from passing through a strategically important area. A tank and the accompanying ground units may also have their forward progress slowed or prevented by such ground wire because the accompanying ground units can not easily pass through the wire.

A number of patents disclose the use of devices mounted on the front of a vehicle for cutting a wire or fence. Considering some of these, U.S. Pat. No. 3,841,656 (Kramb et al.) discloses a cable cutting device which comprises a elongated body member having a forward, generally horizontal portion and a rearward upwardly sweeping portion having a cutter hook for severing a cable caught in the hook. In operation, as the vehicle moves along a path and the cable is encountered, the cable will be forced into the hook, where the cable will be severed by the cutting action of the hook during the forward motion of the vehicle.

U.S. Pat. No. 3,770,292 (Anderson) discloses a safety device for snowmobiles which comprises a plurality of hook-like members located along a bar which conforms to the nose shape of a snowmobile. This device severs a wire in a hook during the forward motion of the snowmobile.

U.S. Pat. No. 3,743,316 (Stotesbery) discloses a safety device for snowmobiles comprising an upright bar which extends over the windshield of a snowmobile. The bar terminates in a hook which is utilized in cutting strands of fence wire and small branches. This device functions similarly to those described above in that forward motion of the snowmobile provides the force necessary to the hook to cut through the obstruction captured in the hook.

U.S. Pat. No. 3,724,579 (Albertson) discloses a safety device for all terrain vehicles comprising a hook-shaped member which mounts upon a windshield of a vehicle such as a snowmobile. The bottom of the hook-shaped member is secured to the vehicle by a cable which attaches, at one end, to the vehicle and at the other end to the hook-shaped member. The operation of the device is similar to that of the devices described above.

SUMMARY OF THE INVENTION

In accordance with the invention, a wire cutter device is provided for electrically cutting wire so as to, for example, enable a land vehicle and accompanying troops to pass through a region protected by such wire. In this example, the device can be used to cut through the remaining concertina wire that is not cleared by primary techniques such as a mine clearing line charge. The wire cutter of the invention does not require the forward motion of the vehicle to provide mechanical cutting of the wire and in general can be used to cut any thickness of wire located in front of the vehicle.

According to a preferred embodiment of the invention, a wire cutter device for a land vehicle comprises first and second conductive rods; means for connecting the first rod to a first voltage of a first value and for connecting the second rod to a second voltage of a second different value; a wire catcher means, on which the rods are mounted, for capturing wires located in the path of the vehicle and for guiding wires so captured to the rods so as to complete an electrical circuit through the rods and thus provide melting of the wires; and a mounting means for securing the device to the land vehicle.

Other features and advantages of the invention will be set forth in, or apparent from, the following detailed description of preferred embodiments of the invention.

DESCRIPTION OF THE PREFERRED EMBODIMENTS

Figure 1:
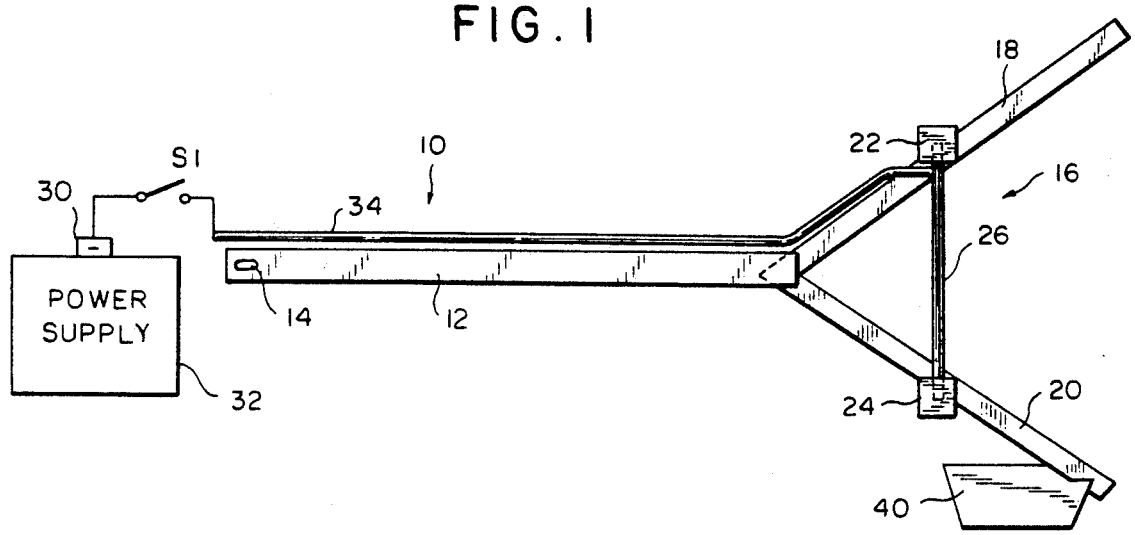
FIG. 1 is a side elevational view of a wire cutter constructed in accordance with a preferred embodiment of the invention.
Figure 2:
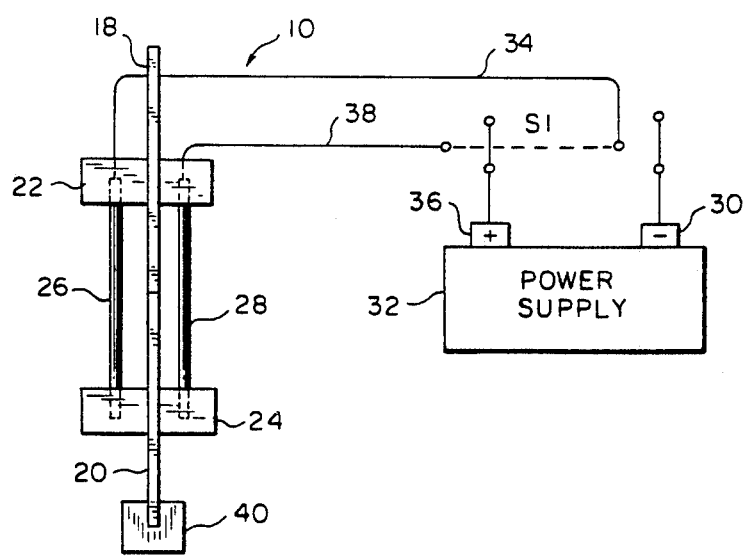
FIG. 2 is a front elevational view of the wire cutter of FIG. 1.
Figure 3:
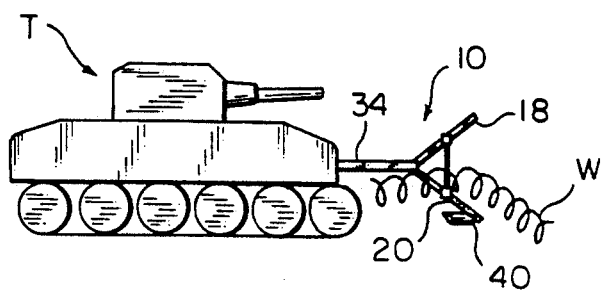
FIG. 3 is a side elevational view of the wire cutter of FIG. 1 attached to a tank.
Figure 4:
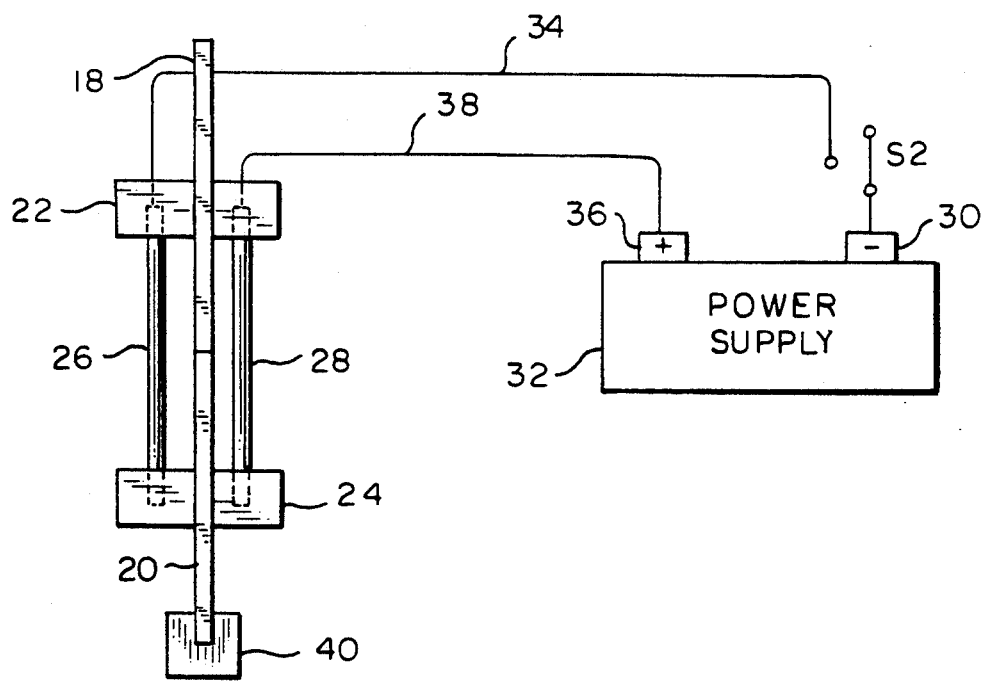
FIG. 4 is a side elevation view of the wire cutter with a single pole switch.

Referring to FIGS. 1 and 2, there is illustrated a wire cutter, generally denoted 10, which is adapted to be attached to a land vehicle not shown in FIGS. 1 and 2 but is represented by a tank T illustrated schematically in FIG. 3. The wire cutter 10 comprises a connector or support member 12 having a eye 14 located at one end and a wire catcher 16 mounted at the other end. Eye 14 is adapted to engage a conventional mounting bracket (not shown) for which attaching support member 12 to the land vehicle e.g. to tank T of FIG. 3. The wire catcher 16 is formed by a pair of catcher arms 18 and 20 which are attached together at one end and extend generally perpendicular to one another, i.e., form an angle of 90° there between. The wire catcher 16 is orientated so that the plane defined by the catcher arms 18 and 20 passes through the land vehicle. In a preferred embodiment, the catcher arms 18 and 20 have a length of at least five feet. A ski or ground support member 40 is attached to the base of lower catcher arm 20 to prevent arm 20 from contacting the ground.

The wire catcher 16 further includes a pair of insulating support members or blocks 22 and 24, with block 22 being mounted on arm 18 and block 24 being mounted on arm 20. In the illustrated embodiment, blocks 22 and 24 are mounted approximately halfway along the lengths of the respective arms 18 and 20, and extend laterally outward on both sides thereof as shown in FIG. 2. In a specific embodiment, support blocks 22 and 24 have a length of at least three inches and are constructed of a insulative material such as wood, plastic or other like materials known in the art. Support blocks 22 and 24 are used to support a pair of conductive rods 26 and 28 so that these rods extend vertically between arms 18 and 20, as illustrated. In a specific embodiment, blocks 22 and 24 each include two holes spaced approximately two inches apart and centered along the lengths of the respective support blocks 22 and 24 so as to support the conductive rods 26 and 28 between the blocks 22 and 24 and thus between the arms 18 and 20. It should be noted that the spacing between the conductive rods 26 and 28 is not critical, the spacing should be sufficient to prevent accidental arcing between the conductive rods.

Electrical power is supplied to rods 26 and 28 from a suitable source which, e.g., can be the electrical supply for tank T or another land vehicle, or a separate supply carried by the vehicle. In the illustrated embodiment, an electrical connection is provided between a negative pole or other connector 30 of a power supply 32 and the conductive rod 26 by a power transmission line 34. Similarly, an electrical connection is provided between the positive pole 36 of power supply 32 and conductive rod 28 by a power transmission line 38. An optional double pole switch S1 is provided to control the connection of conductive rods 26 and 28 to power supply 32. The use of a switch S1 allows for additional safety in preventing accidental electrical shock by disconnecting conductive rods 26 and 28 from the power supply 32 until the switch S1 is closed and conductive rods 26 and 28 are short circuited. A single pole switch may be utilized in place of the double pole switch S1 but will have the disadvantage of not completely eliminating the possibility of electrical shock. As noted above, the power supply 32 can be supplied by the internal power supply of the land vehicle or can be an independent source of energy such as a battery or group of batteries.

In operation, the wire cutter 10 is mounted to a land vehicle such as tank T of FIG. 3 by a conventional bracket (not shown) which secures support or connector member 12, through means of eye 14, to the land vehicle. Preferably, switch S1 is open and thus accidental electrical shock may be avoided. When the land vehicle approaches a wire indicated a W in FIG. 3, switch S1 is closed, thereby completing the electrical connections between conductive rods 26 and power supply 32. As the vehicle T approaches the wire W, the arms 18 and 20 of the wire catcher 16 guide the wire W toward the conductive rods 26 and 28. When the wire W contacts conductive rods 26 and 28, an electrical circuit is completed between the positive pole 36 and negative pole 30 of power supply 32. The current flowing between poles 36 and 30 causes heating and eventually melting of the wire W. When the wire W melts, the electrical circuit between the positive pole 36 and negative pole 30 of power supply 32 is broken. Thus, electricity, instead of the forward motion of the vehicle, is utilized in cutting the wire.

Although the present invention has been described to specific exemplary embodiments thereof, it will be understood by those skilled in the art that variations and modifications can be effected in these exemplary embodiments without departing from the scope and spirit of the invention.

What is claimed is:

1. A wire cutter device for cutting a path through wires to allow a land vehicle on which the wire cutter is mounted to pass therethrough, said wire cutter device comprising:
   first and second spaced conductive rods;
   means for connecting said first rod to a first voltage of a first value and for connecting said second rod to a second voltage of a second different value;
   wire catcher means, on which said rods are mounted, for capturing wires located in the path of the vehicle and for guiding wires so captured to said rods so as to complete an electrical circuit through said rods and thus provide melting of the wires so captured; and
   mounting means for securing said device to the land vehicle.

2. The device recited in claim 1 further comprising a power supply for providing said first and second voltages.

3. The device recited in claim 2 wherein said power supply comprises an existing electrical energy source on said land vehicle.

4. The device recited in claim 2 wherein said power supply comprises at least one battery.

5. The device recited in claim 1 wherein said rods have an air gap of at least two inches therebetween to prevent accidental arcing between said rods.

6. The device recited in claim 1 wherein said wire catcher means comprises first and second catcher arms disposed in a vertical plane and arranged at a 90° angle from one another to form a wedge shaped space therebetween which opens away from said rods and in which wires can be captured.

7. The device recited in claim 6 further comprising spacer means attached to a lower arm of said first and second catcher arms for spacing said lower arm above ground level.

8. The device recited in claim 7 wherein said spacer means comprises a ski attached to said lower arm.

9. The device recited in claim 2 further comprising a switch means for making and breaking the electrical connection between said power supply and said conductive rods.

10. The device recited in claim 9 wherein said switch means comprises a single pole switch.

11. The device recited in claim 9 wherein said switch means comprises a double pole switch.

12. A wire cutter device for cutting a path through wires to allow a land vehicle on which the wire cutter is mounted to pass therethrough, said wire cutter device comprising:
   first and second spaced conductive rods;
   means for connecting said first rod to a first voltage of a first value and for connecting said second rod to a second voltage of a second different value;
   a switch means for making and breaking the electrical connection between said first and second rods and said first and second voltage values;
   wire catcher means, on which said rods are mounted, for capturing wires located in the path of the vehicle and for guiding wires so captured to said rods so as to complete an electrical circuit through said rods and thus provide melting of the wires so captured, said wire catcher means comprising first and second catcher arms disposed in a vertical plane and arranged at a 90° angle from one another to form a wedge shaped space therebetween which opens away from said rods and in which wires can be captured; and
   mounting means for securing said device to the land vehicle.

13. A wire cutter device for cutting a path through wires to allow a land vehicle on which the wire cutter is mounted to pass therethrough, said wire cutter device comprising:

an electrical power supply having positive and negative poles;

first and second spaced conductive rods, said first rod being electrically connected to said positive pole and said second rod being electrically connected to said negative pole;

guide means for guiding wires in the path of the vehicle into contact with said rods to provide melting of these wires; and mounting means for securing said rods and said guide means to the land vehicle.

14. The device recited in claim 13 wherein said rods have an air gap of at least two inches therebetween to prevent accidental arcing between said rods.

15. The device recited in claim 13 further comprising switching means for breaking the electrical connection between said power supply and at least one of said rods.

* * * * *